United States Patent
King

[15] 3,685,370
[45] Aug. 22, 1972

[54] TRANSMISSION CONTROL HAVING A SHIFT OVERLAP VALVE

[72] Inventor: Michael F. King, Brownsburg, Ind.

[73] Assignee: General Motors Corporation, Detroit, Mich.

[22] Filed: June 29, 1970

[21] Appl. No.: 50,540

[52] U.S. Cl. .................... 74/645, 74/869, 192/3.27
[51] Int. Cl. ...... B60k 21/02, F16h 47/08, F16h 45/00
[58] Field of Search ............... 74/868, 869, 870, 645; 192/3.25, 3.26, 3.27, 3.32

[56] References Cited

UNITED STATES PATENTS

| | | | |
|---|---|---|---|
| 3,000,230 | 9/1961 | Froslie | 74/869 |
| 3,602,344 | 8/1971 | Clark | 192/3.26 |
| 2,792,716 | 5/1957 | Christenson | 74/869 |
| 3,359,832 | 12/1967 | Schjolin et al. | 192/3.26 X |
| 2,699,074 | 1/1955 | Livezey et al. | 192/3.26 X |
| 2,757,552 | 8/1956 | English | 74/869 |
| 2,929,478 | 3/1960 | Tuck et al. | 192/87.13 X |
| 2,933,172 | 4/1960 | Fisher et al. | 192/87.13 |
| 2,936,864 | 5/1960 | Schjolin et al. | 192/87.13 X |
| 3,163,270 | 12/1964 | Zingsheim | 192/3.27 |
| 3,182,775 | 5/1965 | Schall | 192/3.27 |

*Primary Examiner*—Carlton R. Croyle
*Assistant Examiner*—Thomas C. Perry
*Attorney*—W. E. Finken, A. M. Heiter and D. F. Scherer

[57] ABSTRACT

A transmission control system having shift valves for controlling the interchange of friction devices which control the transmission drive ratios. One shift valve cooperates with an overlap valve to control the overlap time during interchange of two of the friction devices. The first shift valve and the overlap valve also prevent shifting of a second shift valve until the first shift is completed. An electrical solenoid associated with one shift valve and the overlap valve controls the overlap time. A second electrical solenoid associated with the overlap valve is operable to maintain one friction device engaged irregardless of the position of the one shift valve or the engagement of the other friction device.

7 Claims, 4 Drawing Figures

PATENTED AUG 22 1972
3,685,370
SHEET 1 OF 2
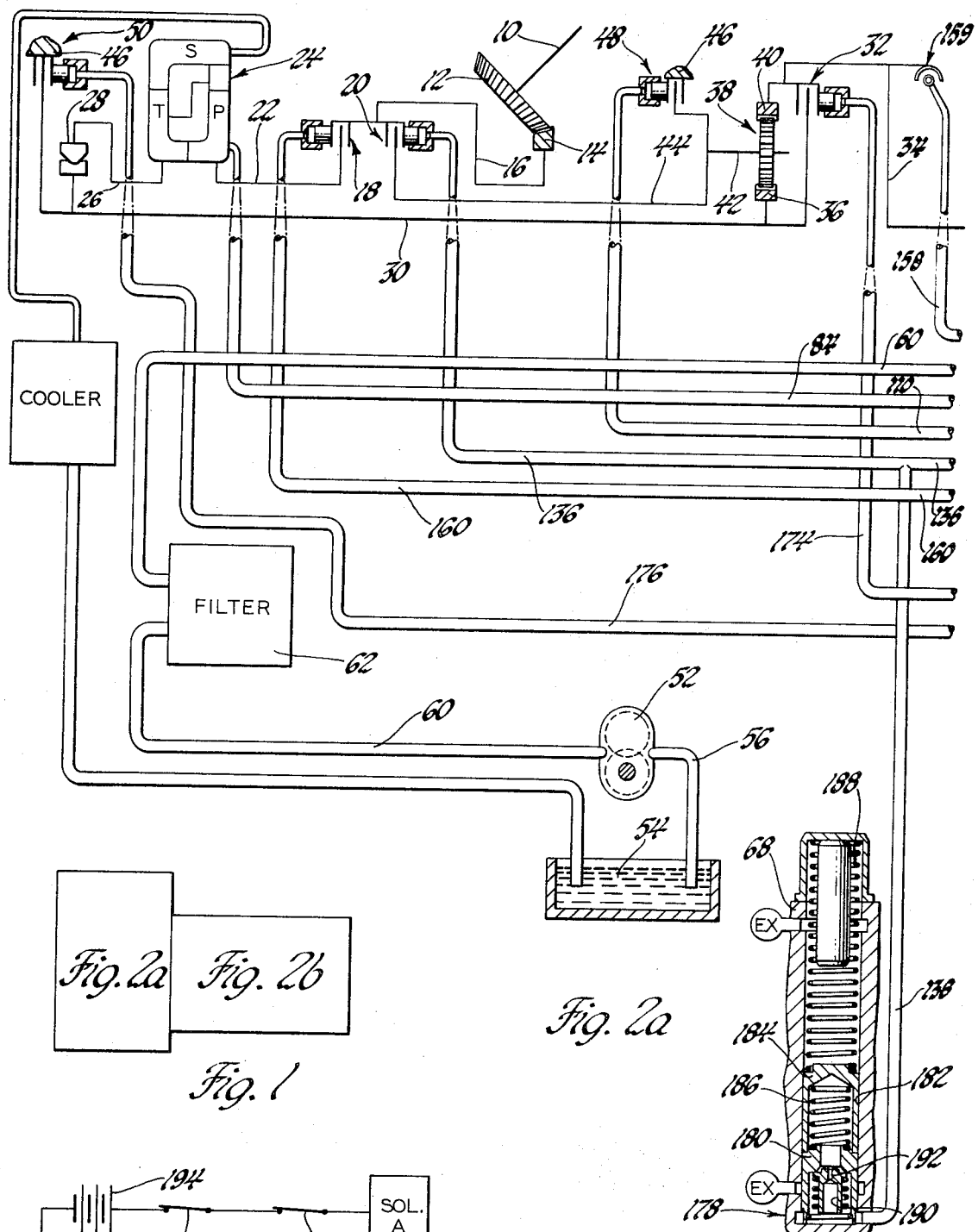
Fig. 2a
TRIMMER VALVE
| Fig. 2a | Fig. 2b |
Fig. 1
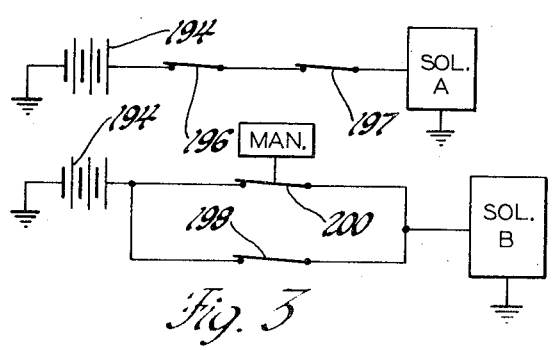
Fig. 3
INVENTOR.
Michael F. King
BY
Donald F. Scherer
ATTORNEY

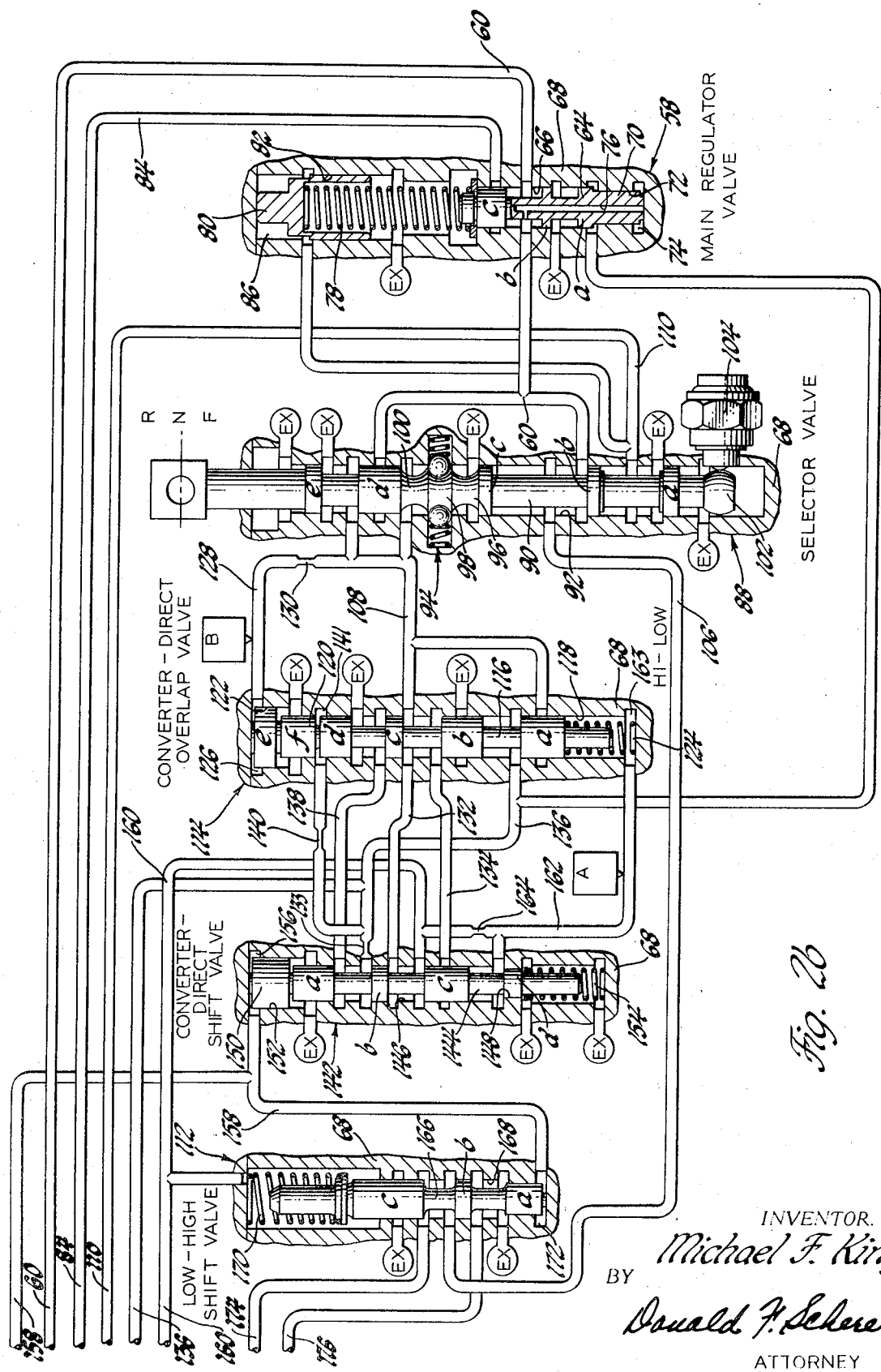

TRANSMISSION CONTROL HAVING A SHIFT OVERLAP VALVE

The present invention relates to controls for automatic transmissions and more particularly to controls wherein an overlap between two friction devices is desired.

In heavy-duty transmissions such as those used in passenger coaches and trucks a clutched drive to a torque converter is used to provide high torque multiplication during start up of the vehicle and a direct clutch is engaged after the vehicle has been accelerated to increase vehicle economy. During the interchange from converter drive to direct drive, it is desirable to maintain the torque converter in the drive system until the direct clutch is fully engaged. These two clutches are engaged at the same time to prevent a loss in power flow from the input to the output which would result in deceleration of the vehicle and runaway of the engine. To accomplish this dual engagement time, the present invention incorporates an overlap valve which is associated with the converter to direct shift valve. During a shift from converter drive to direct drive, the shift valve is shifted by a governor signal to provide a fluid connection between the pressure source and the direct clutch while the overlap valve remains in the downshifted position to maintain a fluid connection between the pressure source and the converter clutch. As the pressure in the direct clutch increases, this pressure is directed to one end of an overlap valve so that the overlap valve will be upshifted when the direct clutch is fully pressurized. As the direct clutch is fully pressurized, the overlap valve will be caused to shift thereby connecting the converter clutch to exhaust to permit the clutch to disengage.

It is also desirable to provide overlap during the direct to converter shift. These same two clutches are again engaged at the same time to prevent loss of engine retarding effect which would result in output overrun of the input in the transmission. When a direct to converter shift occurs, governor pressure is reduced due to decreasing vehicle speed thereby permitting the shift valve to downshift to establish fluid communication from the source to the converter clutch to enforce engagement thereof. When the converter clutch reaches engagement proportions, the clutch pressure, acting on the overlap valve, and a bias spring will move the overlap valve to the unshifted position to disengage the direct clutch.

It is also desirable at times such as during coasting of the vehicle, to maintain the direct clutch engaged. To this end an electrical solenoid valve is positioned in a fluid connection between the shift valve and the overlap valve to exhaust one end of the overlap valve thereby eliminating a pressure bias on the overlap valve so that pressure in the direct clutch will hold the overlap valve in the shifted position. It is also desirable at times to engage the direct clutch irregardless of the engagement of the converter clutch. This is especially true during downhill driving when engine braking is desired to prevent vehicle acceleration. To provide for a manual control of the direct clutch, a solenoid valve is associated with the overlap valve to control pressure buildup on a plug valve adjacent one end of the overlap valve. The solenoid valve can be actuated by the operator to engage the direct clutch at will. However, to prevent engagement of the direct clutch at engine idle throttle settings, this solenoid is also controlled by the vehicle throttle control so that at the idle throttle position the solenoid valve will be opened thereby preventing pressure buildup on the plug valve and the engagement of the direct clutch.

The transmission also has a low and high gear ratio. The shifting between the low and high gear ratio is controlled by a second shift valve. It is desirable, however, not to permit a low to high ratio change when the converter clutch is engaged and a converter drive is being used. Therefore, to prevent a low-high shift, the converter clutch feed line is directed to one end of the low-high shift valve to prevent shifting of this valve whenever the converter clutch is engaged.

It is therefore an object of this invention to provide in an improved transmission control a shift valve for controlling interchange of two friction devices and an overlap valve for controlling the overlap time during the interchange.

It is another object of this invention to provide in an improved transmission control a shift valve for controlling shifting between two friction devices, an overlap valve for controlling the overlap time between shifting of these two devices and a pair of solenoid valves one of which reduces or eliminates overlap time and the other of which controls direct engagement of one of the friction devices.

Another object of this invention is to provide in an improved transmission control a pair of shift valves for controlling the interengagement of four friction devices, an overlap valve for controlling the overlap time between the interengagement of two of the friction devices and a fluid connection to one of the friction devices to prevent shifting of the second shift valve until a first shift has been completed.

These and other objects and advantages of the present invention will be more apparent from the following description and drawings in which:

FIG. 1 is a layout showing the relative positions of FIGS. 2a and 2b;

FIGS. 2a and 2b are a diagrammatic representation of the transmission and control system; and FIG. 3 is a diagrammatic representation of the electrical system used with the two solenoid valves.

Referring to the drawings, there is shown a power transmission having an input shaft 10 driving a pair of bevel gears 12 and 14. The bevel gear 14 is drivingly connected to a hub 16 of a converter clutch 18 and a direct clutch 20. The converter clutch 18 is connected through a shaft 22 to a pump p of a torque converter 24. The output of the torque converter 24 which is a turbine T is connected by a shaft 26 to a one-way clutch 28. The clutch 28 is drivingly connected to an intermediate shaft 30 which is selectively connectible through a clutch 32 to the transmission output shaft 34 and is drivingly connected to a sun gear 36 of a planetary gearing 38. The ring gear 40 of the planetary gearing 38 is drivingly connected to the output shaft 34 while the carrier 42 of the planetary gearing 38 is drivingly connected through an intermediate shaft 44 with the direct clutch 20 and is selectively connectible to the transmission housing 46 through a reverse brake 48. The intermediate shaft 30 and sun gear 36 are selectively connectible with the transmission housing 46 through an overdrive or high brake 50.

During operation in the low drive ratio, the converter clutch 18 is engaged and the low clutch 32 is engaged. With these two friction devices engaged, a drive connection is provided between the input shaft 10 and the output shaft 34 through the torque converter 24. The torque converter 24 provides torque multiplication between the input shaft 10 and the output shaft 34 for initial acceleration of the vehicle. After the vehicle has been accelerated sufficiently, the direct clutch 20 is engaged and the converter clutch 18 is disengaged thereby providing a direct drive connection from the input shaft 10 to the output shaft 34 with no torque multiplication except that provided by the bevel gearing 12 and 14. To further increase vehicle speed, the high brake 50 is engaged while the low clutch 32 is disengaged. There is no overlap between these two devices. Engagement of the overdrive brake 50 provides an overdrive ratio in the planetary gear set 38 so that a speed increase from the input shaft 10 to the output shaft 34 is obtained again depending on the gear ratio of the bevel gears 12 and 14. When the overdrive brake 50 is engaged, the converter clutch 18 must be disengaged since any attempt to drive the torque converter at this time is impractical since the turbine T of the torque converter is effectively grounded by the overdrive brake 50 through the one-way clutch 28. A more complete description of this gearing can be found in U.S. application Ser. No. 820,723 filed May 1, 1969, now U.S. Pat. No. 3,543,607.

The control system for controlling the clutches and brakes of the transmission shown in FIGS. 2a and 2b includes a fluid pump 52 which draws fluid from a reservoir 54 to an intake passage 56 and delivers fluid to a regulator valve 58 through main passage 60 and a filter 62. The regulator valve 58 includes a valve spool 64 having three equal diameter spaced lands a, b and c slidably disposed in a valve bore 66 of a valve body 68. The lower end 70 of valve spool 64 is slidably disposed in a reduced diameter bore 72 such that an area differential is present between land a and end 70. The valve spool 64 and valve bore 72 cooperate to form a chamber 74 which is in fluid communication with the space between lands b and c by a passage 76. The main passage 60 is also connected to the main regulator valve 58 between the lands b and c. A bias spring 78 is compressed between one end of valve spool 64 and piston valve 80 which is slidably disposed in valve bore 82. This spring provides the initial bias and pressure setting for the regulator valve 58 such that as pressure fluid enters the valve 58 between lands b and c, that pressure is distributed by passage 76 to a chamber 74 which urges the valve spool 64 upward against a spring 78 to open passage 84 which communicates fluid to the torque converter 24. As the valve spool 64 continues to move upward, the space between lands a and b begins to open to passage 60 which permits the exhaust of excess fluid to the exhaust passage present and limits the pressure in the system. The piston valve 80 cooperates with the valve bore 82 to provide a chamber 86 which is used to produce a reverse pressure boost which will be described later. The differential area between land a and lower end 70 is used to produce a pressure decrease in direct drive as will be explained later.

The main passage 60 directs fluid from the regulator valve 58 to the manual selector valve 88 which includes a valve spool 90 having equal diameter spaced lands a, b, c, d and e slidably disposed in a valve bore 92 of the valve body 68. The valve spool 90 is positioned in forward F, neutral N and reverse R positions by a ball detent mechanism 94 which cooperates with three grooves 96, 98 and 100 on the valve spool 90. In the neutral position shown, the lower end of valve spool 90 has a spherical portion 102 which contacts a neutral switch 104 so that the engine starting can be accomplished only in the neutral position as is the normal practice. Also in fluid communication with the valve bore 92, is a high-low passage 106, a direct-converter passage 108, a reverse passage 110 and a plurality of exhaust passages EX. In the neutral position shown, main passage 60 is connected between lands b and c to the high-low passage 106 while the direct converter passage 108 and the reverse passage 110 are both connected to exhaust. In the forward position, the main passage 60 is connected between lands b and c to the high-low passage 106 and between lands d and e to the direct-converter passage 108, while the direct converter passage 108 is blocked from exhaust by lands d and e and the reverse passage is open to exhaust between lands a and b. In reverse position, a main passage 60 is connected with the reverse passage 110 while the high-low passage 106 is connected between lands b and c to exhaust and the direct-converter passage 108 is open to main passage 60 between lands c and d. The reverse passage 110 is connected to the reverse brake 48 while the high-low passage 106 is connected to the high-low shift valve 112 and the direct-converter passage 108 is connected to the converter-direct overlap valve 114. The reverse passage 110 is also connected to chamber 86 of the main regulator valve 58 to provide an increased bias on the valve spool 64 through the piston valve 80 and the spring 78 to provide a pressure increase in main passage 60 in reverse operation.

The converter-direct overlap valve 114 includes a valve spool 116 having equal diameter spaced lands a, b, c and d slidably disposed in a valve bore 118 in the valve body 68, a plug valve 120 having large diameter land e slidably disposed in a valve bore 122 and a small diameter land f slidably disposed in the valve bore 118, and a bias spring 124 adjacent valve land a and one end of valve bore 118 to hold the converter-direct overlap valve 114 in the downshifted position shown. The land e of plug valve 120 cooperates with valve bore 122 to provide a pressure chamber 126 which is in fluid communication with direct-converter passage 108 via control passage 128 and a fluid restriction 130. The fluid pressure in control passage 128 is controlled by a solenoid valve B such that when the solenoid valve B is opened, no pressure is present in the passage 128 and when the solenoid valve B is closed the pressure in passage 128 and chamber 126 is equal to the pressure in passage 108. The valve bore 118 is in fluid communication with the converter-direct passage 108, a pair of converter passages 132 and 134, and a pair of direct passages 136 and 138. The direct passage 136 is in fluid communication with the area differential between land a and end portion 70 of the main regulator valve 58 to oppose the bias spring 78 to provide a pressure decrease when the direct passage 136 is pressurized. This passage is also in fluid communication with the direct clutch 20, and through a restriction 140 with a chamber 141 between valve spool 116 and plug valve 120. The direct passages 136 and 138 are also in fluid communication with the converter-direct shift valve 142 as are the converter passages 132 and 134.

The converter-direct shift valve 142 includes a valve spool 144 having three equal diameter spaced lands $a$, $b$ and $c$ slidably disposed in a valve bore 146 of valve body 68 and a smaller diameter land d slidably disposed in valve bore 148, a plug valve 150 slidably disposed in a valve bore 152, and a bias spring 154 adjacent one end of valve bore 148 and land $d$. The plug valve 150 cooperates with valve bore 152 to provide a governor chamber 156 which is in fluid communication with a governor passage 158. The governor passage 158 receives a pressure signal from an output driven governor 159 such as the pitot tube type governor which provides a performance parameter for the transmission. When the governor pressure in passage 158 acting on plug valve 150 is sufficient to overcome the bias spring 154, the valve spool 144 will move from the downshifted or converter position shown to the upshifted or direct drive position. The valve bore 146 is in fluid communication with the converter clutch engagement passage 160 which passage is also in fluid communication with the converter clutch 18. The valve bore 148 is in fluid communication with an overlap control passage 162 which is also in fluid communication with a chamber 163 at the lower end of valve spool 116 of the converter-direct overlap valve 114, the area between lands $c$ and $d$ of valve spool 144 and through a restriction 164 with the converter clutch passage 160. Whenever the converter clutch 18 is engaged, the fluid pressure in passage 160 is directed to the restriction 164 to the passage 162. The pressure in passage 162 with the converter-direct shift valve 142 in the position shown is controlled by the solenoid valve A. Thus, when the solenoid valve A is closed, the pressure in passage 162 will act on the lower end of the converter-direct overlap valve 114. As vehicle speed increases the valve spool 144 is shifted by governor pressure in passage 158 so that the area between lands $c$ and $d$ will be opened to exhaust thereby permitting exhaust of passage 162 and eliminating the pressure bias on the lower end of valve spool 116 so that the valve 114 is hydraulically unlocked permitting the following function to take place. When the converter-direct shift valve 142 has been shifted, the direct clutch passage 136 is pressurized via passage 132 and restriction 133 between lands $a$ and $b$ of valve spool 144. The area between land $d$ of valve spool 116 and land $f$ of plug valve 120 is also pressurized through restriction 140. The pressure force between lands $d$ and $f$ must overcome the force of spring 124 in order to move valve 114. The force of spring 124 is such that the direct clutch 20 will be engaged before the converter-direct overlap valve 114 is shifted. As the pressure between lands $d$ and $f$ of valve 114 increases, the valve spool 116 will be moved against spring 124 to upshifted position thereby exhausting the converter clutch 18 via passage 160 between lands $b$ and $c$ of spool 144 and via passage 134 between lands $b$ and $c$ of spool 116. Also, the direct clutch passage 136 is pressurized directly from the direct-converter passage 108 between lands $a$ and $b$ of spool 116.

If the vehicle output speed and, therefore, the pressure in governor passage 158 should decrease a sufficient amount, the converter-direct shift valve 144 will downshift to the position shown. This action will reconnect passages 132 and 160 thereby pressurizing the converter clutch 18. The direct clutch 20 will continue engagement since both passages 138 and 136 will be pressurized by passage 108 between lands $c$ and $d$ and lands $a$ and $b$, respectively, of the spool 116. However, as the converter clutch is pressurized, fluid pressure will develop in passage 162 as it is fed via restriction 164. When the force of this pressure in chamber 163 plus the force of spring 124 becomes equal to and exceeds the pressure force on the end $d$ of valve 116, the valve 116 will be moved to the position shown. In the position shown, the direct clutch 20 will be exhausted through restriction 133 and passage 138. It will be appreciated from the above description that an overlap exists between the converter clutch 18 and the direct clutch 20 during the period of time required to shift valve 116. This overlap timing is controlled by the converter-direct overlap valve 114 in conjunction with the restriction 140 during upshifting and the restriction 164 during downshifting.

As explained above, the solenoid valve B controls manual engagement of the direct clutch irregardless of the position of the converter-direct shift valve 142. As can be seen, when the solenoid valve B is closed, fluid pressure acting on large land $e$ plug valve 120 will cause the converter-direct overlap valve 114 to upshift against any combination of pressure force in chamber 163 and spring force 124 thereby connecting passage 108 between lands $a$ and $b$ OF VALVE ELEMENT 116 TO PASSAGE 136.

Assuming the solenoid valve B is open and the solenoid valve A is closed, if a downshift occurs from direct to converter, the valve spool 144 will move upward thereby disconnecting the passage 162 from exhaust between lands $c$ and $d$ so that pressure will build up rapidly in passage 162 to effect rapid downshifting of the converter-direct overlap valve 114. However, if the solenoid valve A is open during a downshift from direct to converter drive in the shift valve 142, the overlap valve 114 will remain in the upshifted position since no pressure bias will be present at the lower end of spool 116 to cause an upshift of that valve. Thus, the transmission would remain in direct drive with the converter clutch being engaged also.

The low-high shift valve 112 includes a valve spool 166 having equal diameter spaced lands $b$ and $c$ and smaller land $a$ slidably disposed in a stepped valve bore 168 and the bias spring 170 compressed between one end of valve bore 168 and the end of valve spool 166. The valve land $a$ cooperates with valve bore 168 to provide a governor chamber 172 which is in fluid communication with the governor passage 158. The valve bore 168 is in fluid communication via a passage 174 with the low clutch 32 and via a passage 176 with the high brake 50. In the downshifted position shown, the low clutch 32 is supplied with fluid from the high-low passage 106 between lands $b$ and $c$ of valve spool 166. As the output speed of the transmission increases, the governor pressure will initially shift the converter-direct shift valve 142 and then the low-high shift valve 112. When the low-high shift valve 112 upshifts, the low passage 174 will be connected to exhaust between lands *b* and *c* while the high passage 176 will be connected to high-low feed passage 106 between lands *a* and *b* to thereby engage the high brake 50. The pressure between lands *a* and *b* acts on the differential area therebetween to cause snap action of the valve. The converter clutch passage 160 is in fluid communication with the end of valve spool 166 at land *c* to provide a pressure bias opposing upshifting of the valve spool 166 whenever the converter clutch 18 is engaged. The converter clutch pressure in passage 160 plus the force exerted by the bias spring 170 will always be sufficiently high to prevent governor pressure in passage 158 from causing an upshift of the valve spool 166 whenever the converter clutch 18 is engaged.

The pressure rise in the direct clutch 20 is controlled by a trimmer valve 178 which includes a plug valve 180 slidably disposed in a valve bore 182, a piston valve 184 slidably disposed in the valve bore 182, a bias spring 186 compressed between the plug valve 180 and the piston valve 184, a bias spring 188 compressed between one end of valve bore 182 and the piston valve 184, and a check valve 190. As the pressure in passage 160 increases, the plug valve 180 and piston valve 184 will be moved upward against spring 188 until the passage 136 is open to exhaust EX thereby limiting further increase in pressure. The fluid pressure in passage 136 will also pass through a small restriction 192 and the check valve 190 to enter the space between plug valve 180 and piston valve 184 thereby separating these two valves to increase the force in spring 188 thereby increasing the downward bias on the plug valve 180. This increase in downward bias causes an increase in pressure in passage 136. The pressure bias increases slowly to control the pressure increase in passage 136 until the pressure in passage 136 is equal to maximum line pressure as established by the regulator valve 58. A more detailed description of this trimmer valve 178 and its operation can be found in U.S. Pat. to Schaeffer No. 3,459,071, issued Aug. 5, 1969.

The electrical schematics shown in FIG. 3 illustrate the operation of solenoids A and B. Solenoid A is connected to the vehicle battery 194 through a switch 196, responsive to driver manual control and a switch 197, responsive to a vehicle performance parameter such as the engine fuel rack, connected in series. Whenever the driver desires the switch 196 will be closed. When the fuel rack is in other than zero fuel position, the switch 197 will be closed. When both switches 196 and 197 are closed, the solenoid A will be energized and the passage 162 will be exhausted. This feature maintains the direct clutch 20 engaged for maximum engine braking during closed throttle coasting. However, as the engine approaches idle speed during coasting, the engine governor will automatically move the fuel rack to the idle position to maintain fuel feed for engine idling. As the fuel rack is moved to the idle position, the switch 197 will open thereby deenergizing solenoid A so that passage 162 will be pressurized to cause disengagement of the direct clutch 20 at the engine idle condition.

The solenoid valve B is connected to the vehicle battery 194 through a throttle switch 198 and a manual switch 200 which are connected in parallel. When the throttle is in the zero position, the switch 198 will be closed so that solenoid B will be energized and passage 128 will be exhausted. The manual switch 200 is normally closed such that the solenoid B will be energized. However, in throttle settings other than zero, if the operator desires direct clutch to be engaged to induce engine braking, the manual switch 200 can be opened thereby deenergizing solenoid B to close the solenoid valve thereby permitting pressurization of passage 128 which will result in an upshift of the converter-direct overlap valve 114 to engage the direct clutch 20 irregardless of the position of the converter clutch 118 or the converter-direct shift valve 142.

Obviously, many modifications and variations of the present invention are possible in light of the above teachings. It is therefore to be understood that within the scope of the appended claims the invention may be practiced otherwise than as specifically described.

What is claimed is:

1. In a control for a transmission including two ratio establishing devices, said control comprising a source of fluid pressure; shift signal means responsive to a performance parameter of said transmission; shift valve means in fluid communication with said source and said ratio establishing devices and being responsive to said shift signal means for controlling the upshift and downshift interchange of engagement of said ratio devices; overlap valve means in fluid communication with said source, said shift valve and one of said ratio devices and being responsive to shifting of said shift valve means for controlling the overlap time of said two ratio devices and including a pair of fluid chambers at opposite ends of the overlap valve means, first restriction means disposed between said shift valve means and one of said fluid chambers for controlling the overlap during upshift interchange, and second restriction means disposed between said shift valve means and the other fluid chamber for controlling the overlap during downshift interchange.

2. In a transmission, a pair of friction drive establishing means for controlling drive ratios; control means for controlling the engagement and disengagement of said friction drive establishing means including pressure source means for supplying fluid pressure, shift valve means for controlling the upshift and downshift interchange of said friction drive establishing means, overlap control valve means for controlling the overlap time between said friction drive establishing means including valve spool means in fluid communication with said pressure source means and said shift valve means, first pressure chamber means in fluid communication with said shift valve means and operatively connected with one end of said valve spool means, first restriction means between said first chamber means and said shift valve means for controlling the overlap time during the upshift interchange, second pressure chamber means in fluid communication with said shift valve means and operatively connected with the other end of said valve spool means, and second restriction means between said second chamber means and said shift valve means for controlling the overlap during downshift interchange.

3. In a control for a transmission including four ratio establishing devices, said control comprising a source of fluid pressure; shift signal means responsive to a performance parameter of said transmission; first shift valve means in fluid communication with said source and a first and second of said ratio establishing devices and being responsive to said shift signal means for controlling the upshift and downshift interchange of engagement of a first and a second of said ratio devices; overlap valve means in fluid communication with said source, said first shift valve and said second device and being responsive to shifting of said first shift valve for controlling the overlap time of said first and second ratio devices including first restriction means for controlling upshift overlap, and second restriction means for controlling downshift overlap; second shift valve means in fluid communication with said source and a third and a fourth of said ratio devices and being responsive to said shift signal means to effect the upshift and downshift interchange of engagement of said third and fourth ratio devices and being subject to fluid pressure in said first ratio device to maintain said third ratio device engaged when said first ratio device is engaged.

4. In a control for a transmission including four ratio establishing devices, said control comprising a source of fluid pressure; shift signal means responsive to a performance parameter of said transmission; first shift valve means in fluid communication with said source and a first and second of said ratio establishing devices and being responsive to said shift signal means for controlling the interchange of engagement of a first and a second of said ratio devices; overlap valve means in fluid communication with said source, said first shift valve and said second device and being responsive to shifting of said first shift valve for controlling the overlap time of said first and second ratio devices; second shift valve means in fluid communication with said source and a third and a fourth of said ratio devices and being responsive to said shift signal means to effect the interchange of engagement of said third and fourth ratio devices and being subject to fluid pressure in said first ratio device to maintain said third ratio device engaged when said first ratio device is engaged; first electrical valve means operatively connected with said first shift valve means and said overlap valve means having open and closed positions for eliminating said overlap and maintaining said second ratio device engaged after interchange in said open position; and second electrical valve means operatively connected with said source and said overlap valve means and being operable to control said overlap valve means to engage said second device before and after interchange by said first shift valve means.

5. In a transmission, a pair of friction drive establishing means for controlling drive ratios; control means for controlling the engagement and disengagement of said friction drive establishing means including pressure source means for supplying fluid pressure, shift valve means for controlling the interchange of said friction drive establishing means, overlap control valve means for controlling the overlap time between said friction drive establishing means including valve spool means in fluid communication with said pressure source means and said shift valve means, first pressure chamber means in fluid communication with said shift valve means and operatively connected with said valve spool means, restriction means between said first chamber means and said shift valve means for controlling the overlap time, and second pressure chamber means in fluid communication with said pressure source means and operatively connected with said valve spool means for maintaining one of said friction drive establishing means engaged, and solenoid valve means operatively connected with and controlling fluid pressure in said second chamber means.

6. In a control for a transmission including four ratio establishing devices, said control comprising a source of fluid pressure; shift signal means responsive to a performance parameter of said transmission; first shift valve means in fluid communication with said source and a first and second of said ratio establishing devices and being responsive to said shift signal means for controlling the interchange of engagement of a first and a second of said ratio devices; overlap valve means in fluid communication with said source, said first shift valve and said second device and being responsive to shifting of said first shift valve for controlling the overlap time of said first and second ratio devices; second shift valve means in fluid communication with said source and a third and a fourth of said ratio devices and being responsive to said shift signal means to effect the interchange of engagement of said third and fourth ratio devices and being subject to fluid pressure in said first ratio device to maintain said third ratio device engaged when said first ratio device is engaged; vehicle performance responsive valve means operatively connected with said first shift valve means and said overlap valve means having open and closed positions for maintaining said second ratio device engaged after interchange in said open position; and manually responsive and vehicle performance parameter responsive valve means operatively connected with said source and said overlap valve means and being operable manually and by a vehicle performance parameter to control said overlap valve means to engage said second device before and after interchange by said first shift valve means.

7. In a transmission, a pair of friction drive establishing means for controlling drive ratios; control means for controlling the engagement and disengagement of said friction drive establishing means including pressure source means for supplying fluid pressure, shift valve means for controlling the upshift and downshift interchange of said friction drive establishing means, overlap control valve means for controlling the overlap time between said friction drive establishing means including valve spool means in fluid communication with said pressure source means and said shift valve means, first pressure chamber means in fluid communication with said shift valve means and operatively connected with said valve spool means, restriction means for controlling pressure in said first chamber for controlling the overlap time during upshift interchange, second pressure chamber means in fluid communication with said pressure source means and operatively connected with said valve spool means for selectively maintaining one of said friction drive establishing means engaged, and third pressure chamber means in fluid communication with said shift valve means and operatively connected with said valve spool means for controlling the overlap time during downshift interchange, first control valve means responsive to a vehicle performance parameter and operatively connected with and controlling fluid pressure in said first chamber means having an open position for maintaining one of said friction drive establishing means engaged after upshift interchange.

* * * * *